United States Patent [19]

Tsutsumi

[11] 4,336,869
[45] Jun. 29, 1982

[54] STEERING CLUTCH AND BRAKE CONTROL FOR TRACK-TYPE VEHICLES

[75] Inventor: Yoshio Tsutsumi, Hirakata, Japan

[73] Assignee: Kabushiki Kaisha Komatsu Seisakusho, Tokyo, Japan

[21] Appl. No.: 162,438

[22] Filed: Jun. 24, 1980

[30] Foreign Application Priority Data

Jun. 29, 1979 [JP] Japan .................................. 54-81440

[51] Int. Cl.³ ............................................. F16D 67/04
[52] U.S. Cl. ................................ 192/13 R; 192/12 C
[58] Field of Search .................. 192/13 R, 12 C, 4 A; 180/6.2, 9.44; 137/597, 596

[56] References Cited

U.S. PATENT DOCUMENTS

| | | | |
|---|---|---|---|
| 3,080,026 | 3/1963 | Koch | 192/13 R |
| 3,374,846 | 3/1968 | Massone | 192/13 R |
| 3,895,703 | 7/1975 | Schmitt et al. | 192/13 R |
| 3,917,013 | 11/1975 | Orr | 192/13 R |
| 4,029,183 | 6/1977 | Toyomura | 192/13 R |
| 4,137,944 | 2/1979 | Koch | 192/13 R |

*Primary Examiner*—George H. Krizmanich
*Attorney, Agent, or Firm*—Armstrong, Nikaido, Marmelstein & Kubovcik

[57] ABSTRACT

A track-type vehicle having a pair of steering clutches and associated steering brakes which includes a pair of actuator members each movable to sequential positions to sequentially effect disengagement of the respective steering clutches and then actuation of the respective steering brakes. Independent actuation member is provided for allowing the steering brake to be actuated without disengagement of the associated clutch.

3 Claims, 6 Drawing Figures

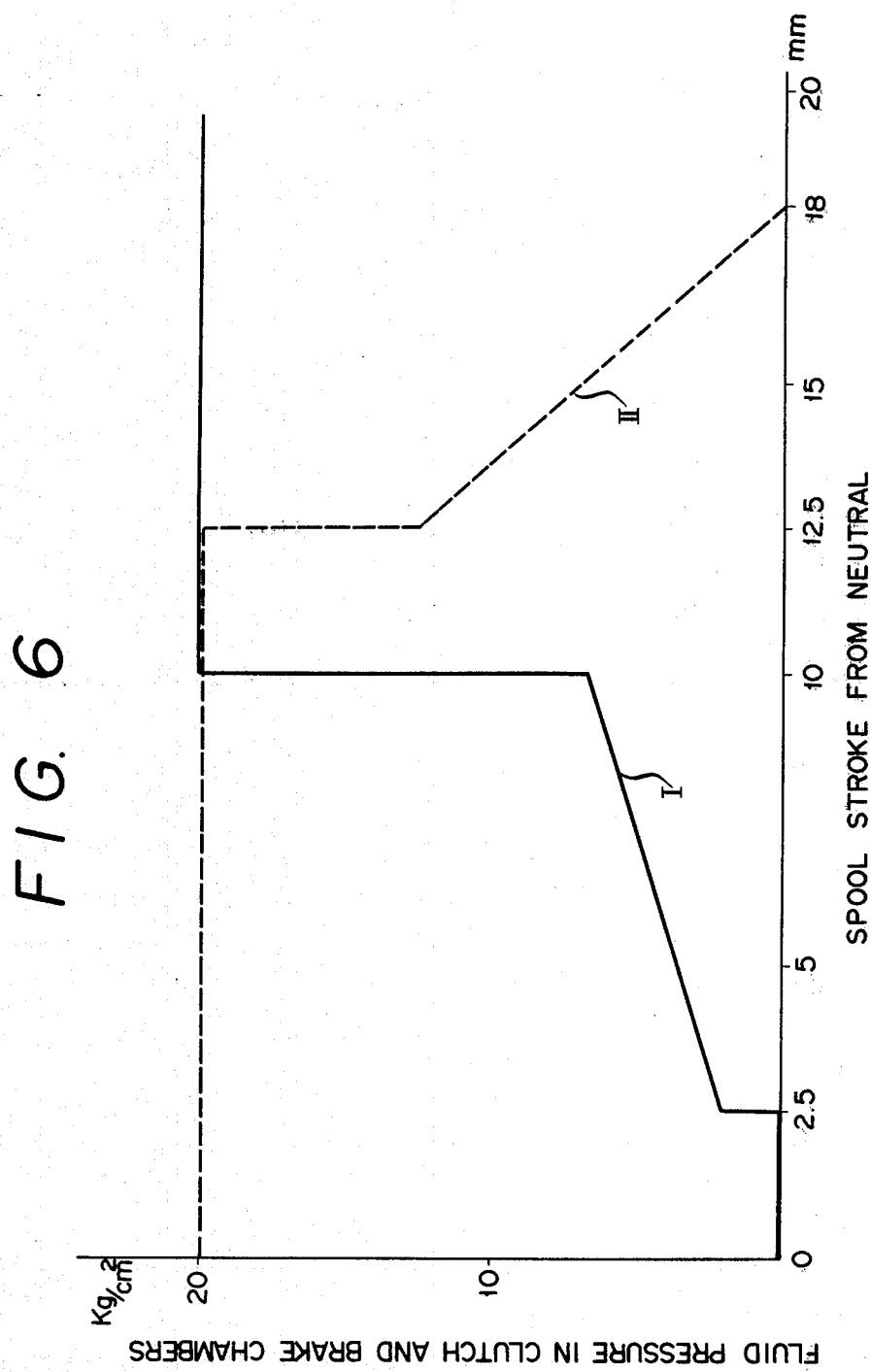

4,336,869

STEERING CLUTCH AND BRAKE CONTROL FOR TRACK-TYPE VEHICLES

BACKGROUND OF THE INVENTION

This invention relates to a steering clutch and brake control for track-type vehicles.

In the conventional steering system having multiple disc wet type clutches and brakes both of which can be engaged by the force of the spring and disengaged by fluid pressure overcoming the force of the spring, a fluid pressure gradually increasing valve is required for each of the clutches whilst a fluid pressure gradually reducing valve is required for each of the brakes in order to use the clutches and brakes, respectively, under half clutch condition and half brake condition. In order to actuate such clutches and brakes on both sides of the vehicle, it is required to use four independent spools to increase and reduce the fluid pressure gradually.

In the fluid system disclosed in U.S. Pat. No. 3,895,703 wherein the clutch fluid pressure and brake fluid pressure are independently controlled by a single spool valve, the arrangement is made such that, with actuation of the spool, the clutch fluid pressure is first increased gradually and then the brake pressure is increased gradually, and so it is not suitable for controlling the above-mentioned steering system.

SUMMARY OF THE INVENTION

It is therefore an object of the present invention to provide, in a vehicle having steering clutches and associated steering brakes, a steering clutch and brake control system in which a pair of single-spool valve means are provided each operable by an actuator member for sequentially effecting disengagement of a steering clutch and then actuation of an associated steering brake.

Another object of the present invention is to provide, in a vehicle having steering clutches and associated steering brakes, a steering clutch and brake control system having an independently operable brake valve means for allowing both of the steering brakes to be actuated regardless of the state of the steering clutches.

In accordance with an aspect of the present invention, there is provided a steering clutch and brake control system for a track-type vehicle in which driving force is applied to both sides thereof, comprising in combination: a source of pressurized fluid; a pair of clutch means each associated with one side of the vehicle and disengageable to disconnect the driving force applied to that side of the vehicle upon application of fluid pressure thereto; a pair of brake means each associated with one side of the vehicle and normally disengaged by fluid pressure applied thereto and engageable upon blocking fluid pressure therefrom; a pair of first valve means each associated with one side of the vehicle and said fluid pressure source and including a reciprocable valve spool positionable in a first position blocking fluid pressure from said clutch means but allowing fluid pressure from said fluid source through said first valve means to said brake means and movable sequentially to second and third positions, said spool in said second position allowing fluid pressure from said fluid source through said first valve means not only to said brake means but also to said clutch means to disengage said clutch means, said spool in said third position allowing fluid pressure from said fluid source through said first valve means to said clutch means to maintain said clutch means in its disengaged state but blocking fluid pressure from said brake means thereby actuating said brake means; and second valve means connected with said fluid source and said first valve means, said second valve means having formed therein a neutral communication position and an offset position where fluid in said brake means is drained through said second valve means to a tank thereby engaging said brake means whether said clutch means is engaged or disengaged.

The above and other objects, features and advantages of the present invention will be readily apparent from the following description taken in conjunction with the accompanying drawings.

BRIEF DESCRIPTION OF THE DRAWINGS

FIG. 6 is a diagram showing a relationship between the spool stroke of a steering clutch and brake control valve from its neutral position and fluid pressure in steering clutch and brake chambers in which solid line represents clutch chamber pressure and broken line designates brake chamber pressure.

DESCRIPTION OF THE PREFERRED EMBODIMENT

The present invention will now be described by way of example only with reference to the accompanying drawings.

Figure 1:
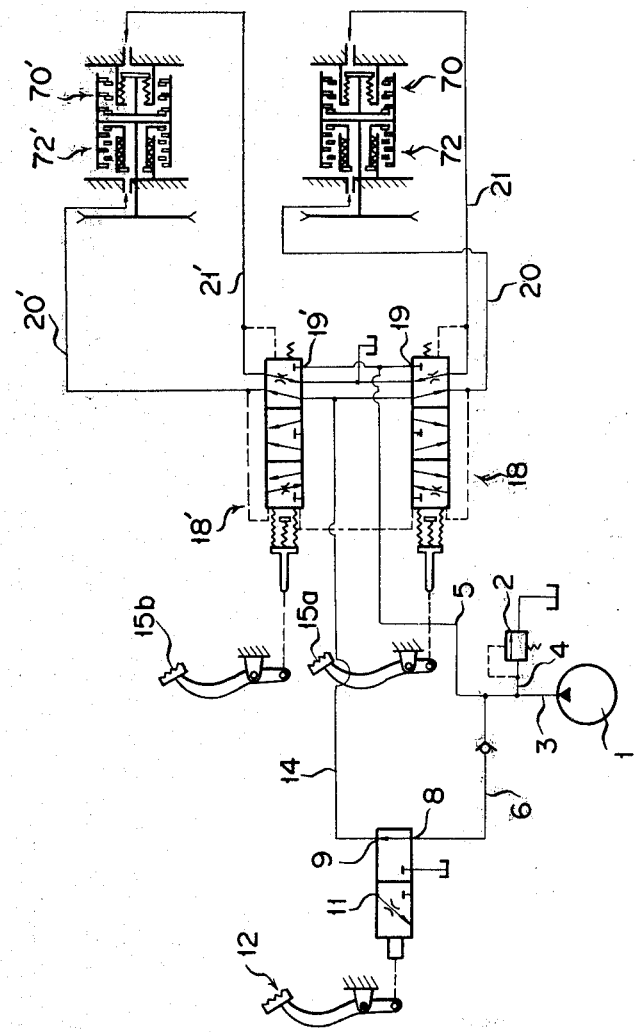
FIG. 1 is a schematic view of a steering clutch and brake control system according to the present invention.
Figure 2:
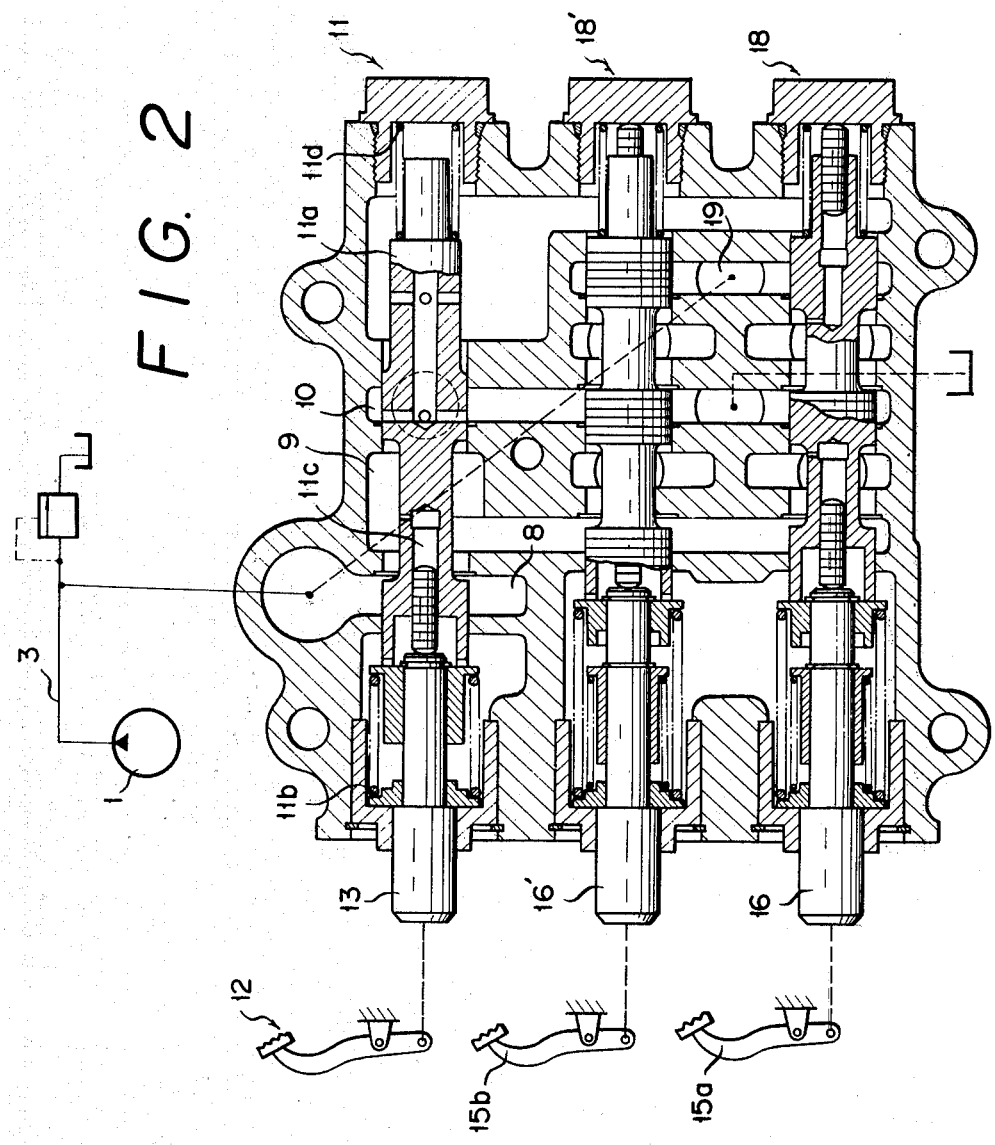
FIG. 2 is a cross-sectional view showing an arrangement of a pair of steering clutch and brake control valves and a brake valve.

Referring to FIG. 1, reference numeral 1 denotes a hydraulic pump, 11 a brake valve, and 18 and 18' steering clutch and brake valves.

Clutches 70 and 70' on the right and left sides of the vehicle are engaged by the force of the spring when the hydraulic pump 1 is driven by an engine not shown and the vehicle is running, whilst brakes 72 and 72' on the right and left sides are rendered inoperative when the hydraulic fluid is introduced into brake chambers through the brake valve 11 and the steering clutch and brake valves 18 and 18'.

Figure 3:
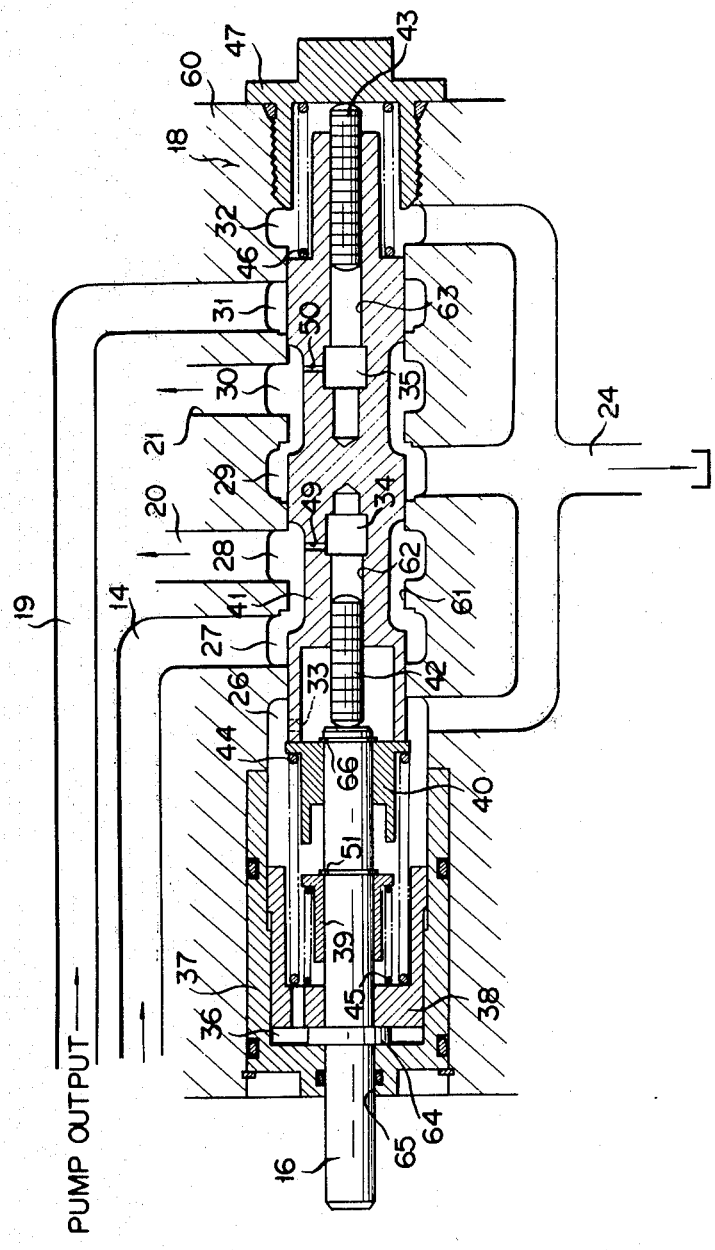
FIG. 3 is an enlarged cross-sectional view of a steering clutch and brake valve shown in FIG. 2 in which the valve is being held in its neutral or first position.

As best shown in FIG. 3, the steering clutch and brake valve 18 comprises a valve body 60 having a bore 61 formed therein, the bore 61 having on one side thereof a sleeve 37 fitted therein and on the other side thereof a cap 47 threadably engaged therein.

The bore 61 comprises a first chamber 31 communicating with a pump port 19, a second chamber 27 connected to a port 14, a chamber 26, a fifth chamber 29 and a sixth chamber 32 all of which communicate with a drain port 24, a third chamber 28 communicating with the right side brake and a fourth chamber 30 communicating with the right side clutch.

Slidably mounted in the bore 61 is a spool 41 having cylindrical bores 62 and 63 formed therein, and the cylindrical bores 62 and 63 have chambers 34 and 35 formed therein, respectively. The chambers 34 and 35 communicate through passages 49 and 50 with the chambers 28 and 30, respectively.

Pistons 42 and 43 are slidably mounted in the cylindrical bores 62 and 63, respectively.

Slidably mounted in the aforementioned sleeve 37 is a piston 38 in which a valve stem 16 is slidably inserted. The valve stem 16 has a stopper portion 64 formed thereon and projects outwards through a hole 65 of the sleeve 37. The valve stem 16 has sleeves 39 and 40 slidably fitted thereto, and a spring 45 is interposed between the sleeve 39 and the piston 38. The sleeve 39 abuts against a stopper 51 formed or mounted on the valve stem 16.

Further, a spring 44 is interposed between the piston 38 and the sleeve 40. The sleeve 40 abuts against a stopper 66 and one end face of the spool 41. The right hand end of the valve stem 16 is kept into contact with the piston 42.

The spool 41 is biased by the resilient force of a spring 46 towards the piston 38.

Although the ablve description is made on the right side steering clutch and brake valve 18 which communicates with the right side clutch and brake to control them, the left side steering clutch and brake valve 18' has also the same construction.

The delivery side of the hydraulic pump 1 is connected through conduits 3 and 5 to the pump ports 19 and 19' of the steering clutch and brake valves 18 and 18'. Further, the delivery side of the hydraulic pump 1 is connected through conduits 3 and 6 to an input port 8 of the brake valve 11. An output port 9 of the brake valve 11 is connected through a conduit 14 to the chambers 27 and 27' of the steering clutch and brake valves 18 and 18'.

The brake valve 11 has a drain port 10 connected to a tank or reservoir. The brake valve 11 has a valve stem 13 connected to a pedal 12.

The valve stems 16 and 16' of the steering clutch and brake valves 18 and 18' are connected to pedals 15a and 15b.

The operation of the present invention will now be described below.

When the spool 41 is located at its neutral position as shown in FIG. 3, the fluid under pressure from the hydraulic pump 1 is allowed to pass through the conduits 3 and 5 and the pump port 19 into the first chamber 31. The fluid under pressure introduced into the first chamber 31 is not allowed to enter any of the chambers because it is blocked by the spool 41. At that time, the clutch chambers are allowed to communicate with the drain circuit, and therefore no pressure is built up in the clutch chambers, and therefore the clutches 70 and 70' are kept under engaged condition, respectively. Further, the fluid under pressure from the hydraulic pump 1 is allowed to pass through the conduits 3 and 6 into the input port 8 of the brake valve 11 (fluid pressure gradually reducing valve) and then through the output port 9 and the conduit 14 into the second chamber 27 of the steering clutch and brake valve 18. Then, the second chamber 27 is allowed to communicate with the third chamber 28 so that the fluid under pressure can pass through the passage 20 into the brake chambers thereby disengaging the brakes 72 and 72', respectively.

Figure 4:
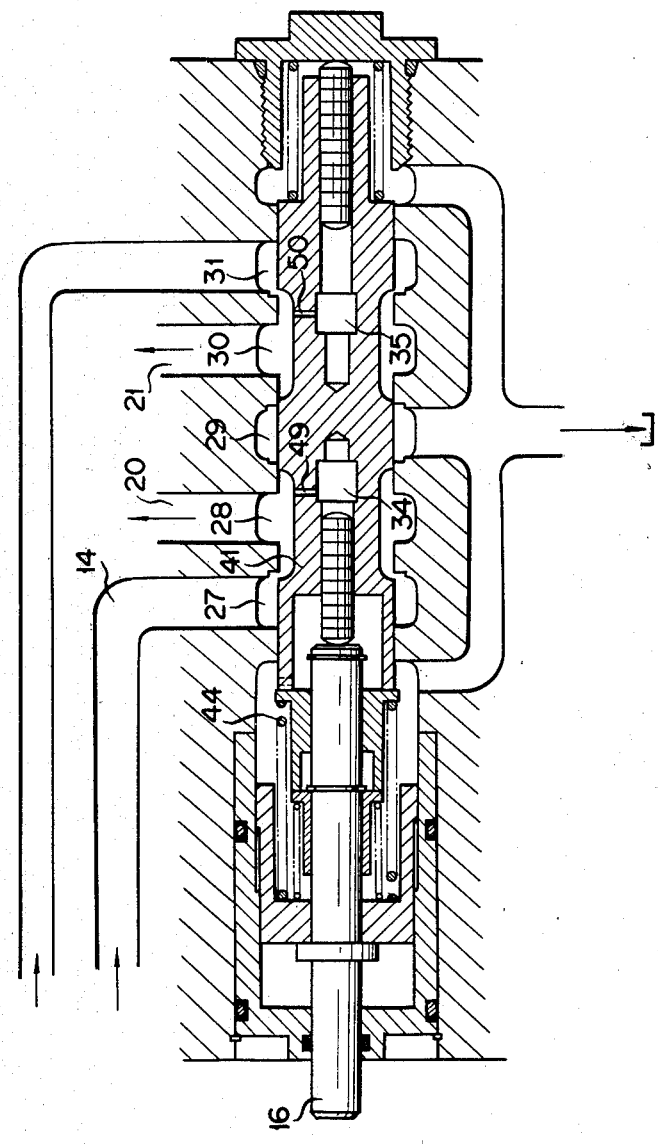
FIG. 4 is similar to FIG. 3 but showing the valve is being held in its second position.

When the right side pedal 15a is depressed so as to move the valve stem 16 to the right as shown in FIG. 4, the fluid under pressure in the first chamber 31 is allowed to flow through the fourth chamber 30 into the passage 21 thereby increasing the pressure within the clutch chamber. At the same time, the fluid under pressure will flow through the passage 50 into the chamber 35 so as to move the spool 41 to the left. The fluid pressure within the chamber 35 which can balance with the resilient force of the spring 44 will become equal to the fluid pressure within the clutch chamber. Accordingly, when the valve stem 16 is urged to the right (so as to contract the spring 44), the fluid pressure in the clutch chamber will increase gradually corresponding to the force of the spring 44 until the condition shown in FIG. 4 is reached, where the pressure within the clutch chamber becomes equal to the pump pressure. At that time, the right side clutch 70 is completely disengaged. Since the fluid under pressure from the conduit 14 is kept flowing through the second chamber 27 into the third chamber 28, the right side brake 72 is kept disengaged.

Under the above-mentioned condition, the vehicle is making a gradual right turn.

Figure 5:
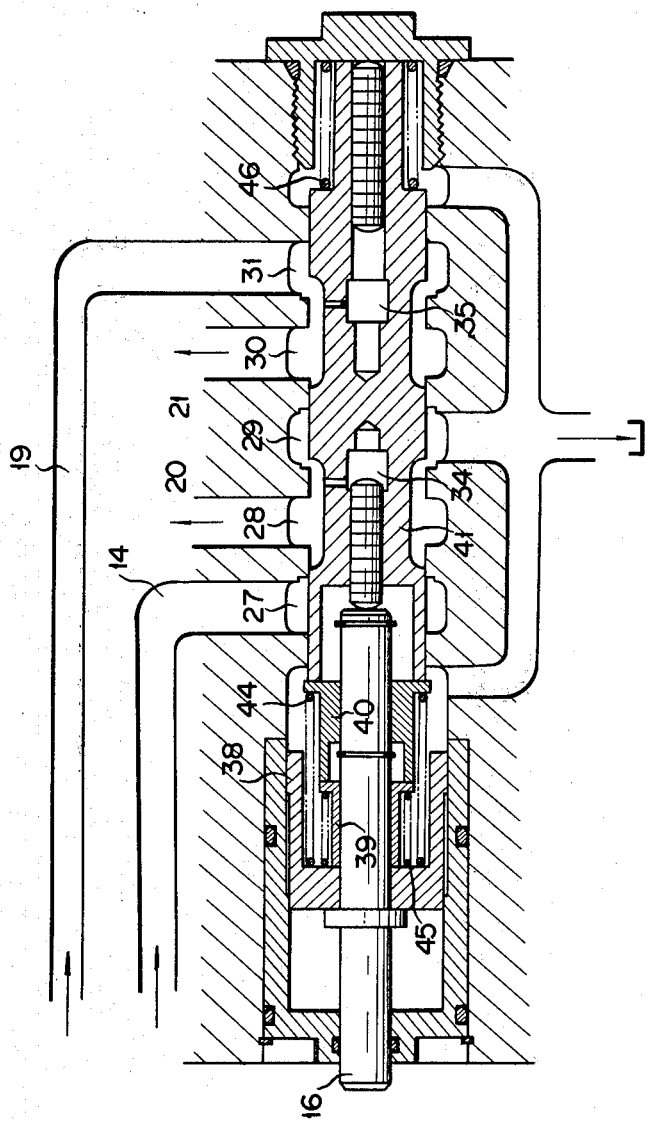
FIG. 5 is similar to FIG. 3 but showing the valve is being held in its third position.

When the valve stem 16 is moved further to the right as shown in FIG. 5, the first chamber 31 remains communicated with the fourth chamber 30 so that the right side clutch 70 may remain disengaged.

Further, the fluid under pressure supplied by the hydraulic pump 1 through the brake valve 11 and the conduit 14 into the third chamber 27 is blocked by the spool 41, and at the same time, the third chamber 28 is allowed to communicate with the fifth chamber 29 and so the fluid pressure within the chamber 28 will decrease. Then, the fluid pressure within the chamber 34 will also decrease. With the decrease in the fluid pressure within the chamber 34, the spool 41 is moved back by the force of the spring 46 to the left so as to cut off the communication between the third chamber 28 and the fifth chamber 29 and allow the second chamber 27 to communicate with the third chamber 28. As a result, the pressure within the chamber 34 will increase again thereby to move the spool 41 to the right. The fluid pressure available at the time will become equal to the pressure within the brake chamber. Therefore, as the valve stem 16 is moved to the right, the fluid pressure within the chamber 34 will decrease gradually, and when the sleeve 39 is urged by the sleeve 40 until it strikes against the piston 38, the spring 44 will cease to contract so as to stop the gradual reduction in the pressure within the chamber 34, but the fluid pressure available at that time will become equal to the drain pressure.

When the valve stem 16 is moved still further to the right, the valve stem 16 will eventually strike against the stopper and stop its rightward movement. The condition available at that time is shown in FIG. 5. Under this condition, the right side clutch 70 is kept disengaged and the right side brake 72 is kept engaged. Therefore, the driver can turn the vehicle quickly to the right.

In case the driver of the vehicle desires to render the brakes operative while the clutches 70 and 70' remain engaged, respectively, it is only necessary for him to depress the pedal 12 connected to the valve stem 13 of the brake valve 11 so as to urge the valve stem 13 to the right. With the rightward movement of the valve stem 13, a spool 11a is moved to the right so that the fluid under pressure supplied from the hydraulic pump 1 is blocked, and at the same time, the fluid under pressure supplied through the steering clutch and brake valves 18 and 18' into the brakes 72 and 72' is discharged into the drain circuit (Refer to FIG. 1). The fluid pressure within the brakes available at that time will become equal to a value wherein the resultant force of a spring 11b on the left side of the spool 11a of the brake valve 11 and the pressure within a chamber 11c formed in the spool 11a can balance with the force of a spring 11d on the right side of the spool 11a. As the valve stem 13 is moved further to the right, the force of the spring 11b will increase gradually and the fluid pressure will decrease gradually. In brief, the fluid pressure which has kept both brakes disengaged will decrease gradually so as to engage the brakes gradually. When the valve stem 13 is urged to its end of stroke by depressing the brake pedal 12, the circuits connected to the brakes are allowed to communicate with the drain circuit thereby engaging the brakes 72 and 72′ completely so as to stop the vehicle completely.

FIG. 6 shows a modulation fluid pressure pattern of the steering clutch and brake valves 18 and 18′ wherein solid line I denotes changes in the clutch pressure and broken line II represents changes in the brake pressure.

The foregoing description is made on the case of turning the vehicle to the right, however, when it is desired to turn the vehicle to the left, it can be made by depressing the left side pedal 15b so as to achieve the entirely same operation as in the aforementioned right turning operations.

It is to be understood that the foregoing description is merely illustrative of a preferred embodiment of the present invention, and that the scope of the invention is not to be limited thereto, but is to be determined by the scope of the appended claims.

What I claim is:

1. A steering clutch and brake control system for a track-type vehicle in which driving force is applied to both sides thereof, comprising in combination:
   a source of pressurized fluid;
   a pair of clutch means each associated with one side of the vehicle and disengageable to disconnect the driving force applied to that side of the vehicle upon application of fluid pressure thereto;
   a pair of brake means each associated with one side of the vehicle and normally disengaged by fluid pressure applied thereto and engageable upon blocking fluid pressure therefrom;
   a pair of first valve means each associated with one side of the vehicle and said fluid pressure source and including a reciprocable valve spool positionable in a first position blocking fluid pressure from said clutch means but allowing fluid pressure from said fluid source through said first valve means to said brake means and movable sequentially to second and third positions, said spool in said second position allowing fluid pressure from said fluid source through said first valve means not only to said brake means but also to said clutch means to disengage said clutch means, said spool in said third position allowing fluid pressure from said fluid source through said first valve means to said clutch means to maintain said clutch means in its disengaged state but blocking fluid pressure from said brake means thereby actuating said brake means; and
   second valve means connected with said fluid source and said first valve means, said second valve means having formed therein a neutral communication position and an offset position where fluid in said brake means is drained through said second valve means to a tank thereby engaging said brake means whether said clutch means is engaged or disengaged.

2. A steering clutch and brake control system as recited in claim 1 further comprising:
   a pair of first actuating members each connected with said respective valve spools so that movement of each of said first actuating members to first, second and third sequential positions moves the associated valve spool to its first, second and third sequential positions; and
   a second actuating member connected with said second valve means for operating the same.

3. A steering clutch and brake control system as recited in claim 1 or 2 wherein each of said first valve means further comprises first resilient means resisting the movement of the respective first actuating members from its first position to its second position at a first spring rate, and second resilient means resisting the movement of the respective first actuating members from its second position to its third position at a second spring rate higher than said first spring rate.

* * * * *